No. 683,820. Patented Oct. 1, 1901.
C. R. VOTH.
BAND CUTTER FOR SELF FEEDERS FOR THRESHING MACHINES.
(Application filed Feb. 7, 1901.)
(No Model.)
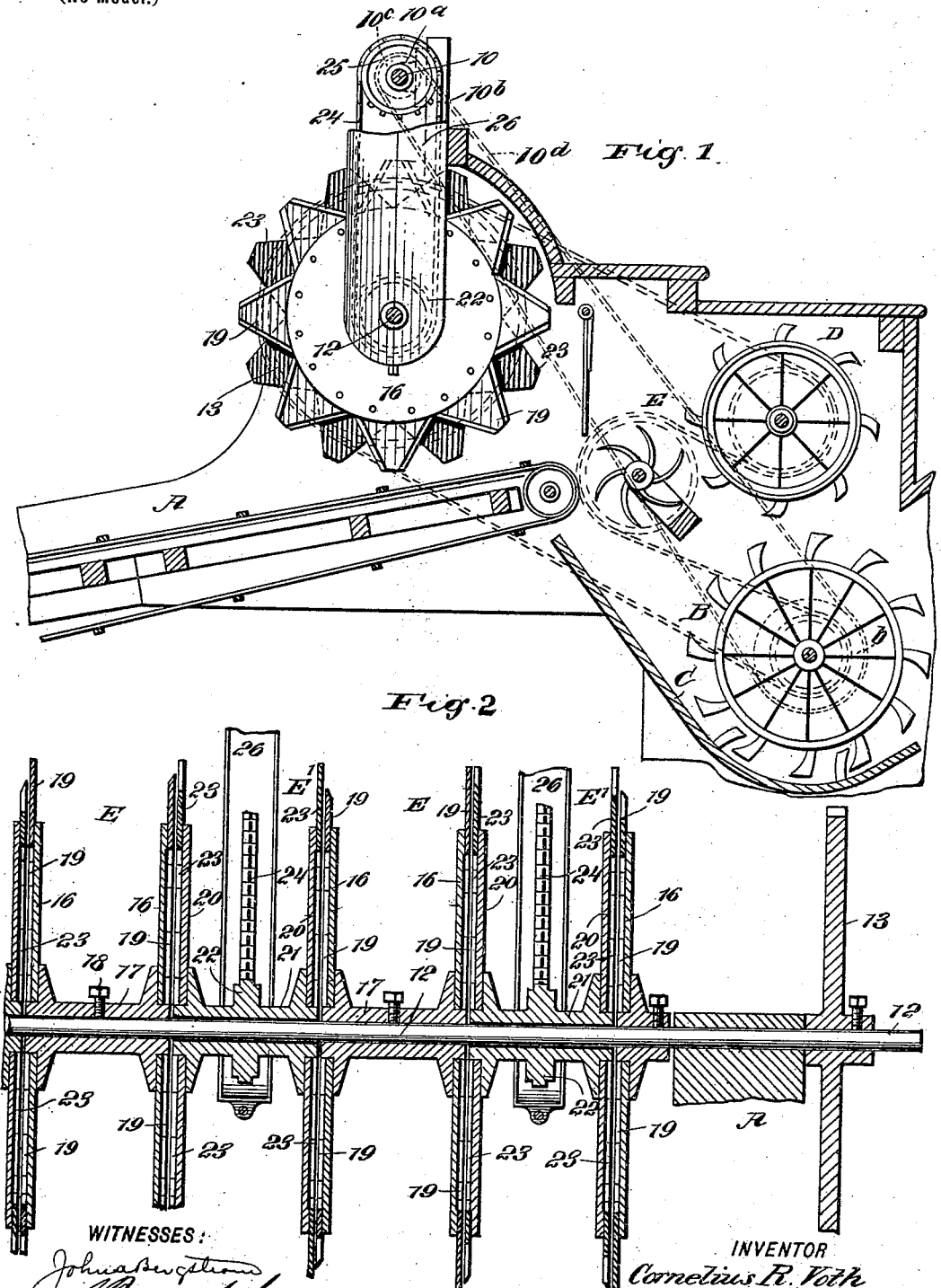
WITNESSES:
INVENTOR
Cornelius R. Voth
BY
ATTORNEYS

UNITED STATES PATENT OFFICE.

CORNELIUS R. VOTH, OF LEHIGH, KANSAS.

BAND-CUTTER FOR SELF-FEEDERS FOR THRESHING-MACHINES.

SPECIFICATION forming part of Letters Patent No. 683,820, dated October 1, 1901.

Application filed February 7, 1901. Serial No. 46,388. (No model.)

*To all whom it may concern:*

Be it known that I, CORNELIUS R. VOTH, a citizen of the United States, and a resident of Lehigh, in the county of Marion and State of Kansas, have invented a new and Improved Band-Cutter for Self-Feeders for Threshing-Machines, of which the following is a full, clear, and exact description.

The purpose of the invention is to provide band-cutters in the form of serrated or knife-carrying disks arranged in coacting pairs, the disks of a pair being driven at different rates of speed, and, further, to provide band-cutters which will produce a positive cut on each bundle that comes within their reach, it being impossible for a bundle to pass under the knives without having the band cut.

The invention consists in the novel construction and combination of the several parts, as will be hereinafter fully set forth, and pointed out in the claims.

Reference is to be had to the accompanying drawings, forming a part of this specification, in which similar characters of reference indicate corresponding parts in both figures.

Figure 1 is a vertical section through the forward or receiving portion of a threshing-machine, showing the improved band-cutters applied; and Fig. 2 is a vertical section through the band-cutters, showing their carrying-shaft in side elevation.

A represents the feed-table of the threshing-machine, across which a shaft 10 transversely extends in suitable bearings 10$^a$ (shown at the upper inner portion of the table) and secured to standards 10$^b$, which extend upward from the table. B and C represent, respectively, the cylinder and the concave of the threshing-machine. D represents a separating-drum, and E a beater, all of which are common to threshing-machines.

A sprocket or similar wheel is usually secured to one end of the shaft 10, connected by a belt or chain with a smaller pulley or wheel secured to one end of the shaft 12, which carries the band-cutters. This shaft 12 is provided with the usual driving-pulley 13, connected with any source of power, and said shaft is journaled in bearings on the feed-table at a point near the delivery end of the latter. The shaft 10 is also provided with a small pulley 10$^c$, from which a belt 10$^d$ extends to a pulley $b$ on the cylinder B and by means of which the said shaft is operated.

The band-cutters are arranged in series, and in their construction, which is best shown in Fig. 2, the disks are arranged in series of pairs E and E', and in the construction of each series E the disks 16 are connected by hubs 17. These hubs are secured on the shaft 12 by set-screws 18 or their equivalents. Teeth or cutters 19 of triangular form are secured to the peripheral portions of the disks 16, both side edges of which cutters or teeth 19 are sharpened. These teeth or cutters 19 are usually secured by rivets or otherwise to the inner faces of the disks to which they belong. Between each pair of disks in the series E a pair of disks of the series E' is located. The disks 20 of the series E' are connected by hubs 21, and these hubs are loosely mounted on the shaft 12. Preferably the disks 16 and 20 are secured to their hubs by bolts, rivets, or equivalent devices. At or near the central portion of each loosely-mounted hub 21 of a pair of disks of the series E' a sprocket-wheel 22 or the equivalent thereof is located or made integral with the hub, as is best shown in Fig. 2. Each disk 20 of the series E' is likewise provided with triangular teeth 23, secured to the disks 20 in like manner as has been described with reference to the disks 16, and the teeth on a disk 20 are so placed that they will be opposite or practically in engagement with the teeth on a disk 16. The disks of the series E', it will be observed, turn loosely on the shaft 12, while the movement of the shaft causes the movement of the disks of the series E, and as the cutters or teeth of opposing disks pass one another they effect a positive cut similar to the cut produced by shears, and as a number of teeth may be used in the construction of each band-cutter it is practically impossible for a cutter to miss the band of a bundle.

The sprocket-wheels 22 on the loosely-mounted hubs 21 are connected by chain belts 24 with the shaft 10, the said belts passing over small sprocket-wheels or pulleys 25, located on the shaft 10, as shown in Fig. 1. In order that the belts 24 and the wheels over which they pass shall not become clogged, these parts are contained in housings 26. It will be observed that the two opposing disks that constitute a band-cutter are rotated at different rates of speed, the loosely-mounted disks being turned slower than the disks which are carried by the main or drive shaft 12.

The main object of this invention is to so construct band-cutters that the self-feeder of a threshing-machine may successfully tear or spread the bundles without danger of choking or slugging the machine or the cylinder. It will be observed that when band-cutters are constructed as above set forth it is impossible for the knives or cutting-teeth to warp or wind at any time or in any grain or condition of grain. In headed grain the slow-speeded disks should be run faster than ordinarily, so as not to cut the grain too much and in order to feed it faster. The speed of the band-cutters can easily be adjusted by simply changing one sprocket-wheel, using a larger or a smaller one. The band-cutters may also be raised or lowered to adapt them to any kind of grain in any condition.

Having thus described my invention, I claim as new and desire to secure by Letters Patent—

1. In a band-cutter, two disk-like knife-carrying members mounted to revolve independently side by side on a horizontal axis, and means for driving them at different speeds, and in operative relation, as set forth.

2. In a band-cutter, two disks mounted to revolve independently side by side on a common horizontal axis and each provided with cutting-teeth at its periphery, and means for driving said disks at different speeds.

3. In a band-cutter, two disks mounted to revolve independently side by side on a common horizontal axis and each provided with triangular teeth at its periphery, and means for revolving the said disks in the same direction at different speeds.

4. In a band-cutter, a drive-shaft, and two disks having cutting-teeth or cutting projections at their peripheries, the disks being arranged to move in the same direction and in close relation, one disk being secured to the shaft and the other disk being loosely mounted thereon, a driven shaft, and a driving connection between the disk-carrying shaft and driven shaft, and the driven shaft and the loosely-mounted disk, whereby the speed of the loosely-mounted disk is less than that of the disk secured on the said shaft, as described.

5. In a band-cutter, a revoluble shaft, a series of hubs on the shaft, the hubs being alternately fixed and loose on the shaft, disks secured to the ends of each hub and each provided with cutting-teeth, and means for revolving the loose hubs at a different speed from that of the said shaft, as set forth.

6. In a band-cutter, a revoluble shaft, a series of hubs on the said shaft, the hubs being alternately fixed and loose on the shaft, a disk secured to each end of each hub, the said disk being provided with the triangular teeth, and means for revolving the loose hubs at a slower speed than the said shaft, as set forth.

In testimony whereof I have signed my name to this specification in the presence of two subscribing witnesses.

CORNELIUS R. VOTH.

Witnesses:
P. P. JANKE,
EPH. JANKE.